Dec. 25, 1945.  W. F. PIOCH ET AL  2,391,510
MATING FIXTURE
Filed May 13, 1944   2 Sheets-Sheet 2
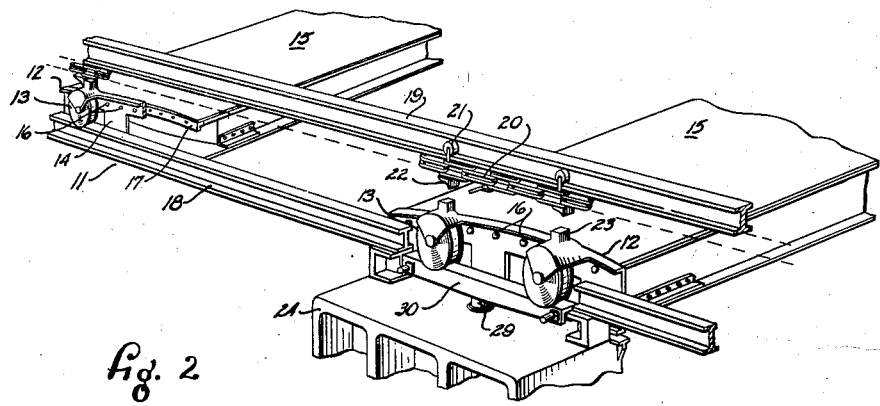
fig. 2
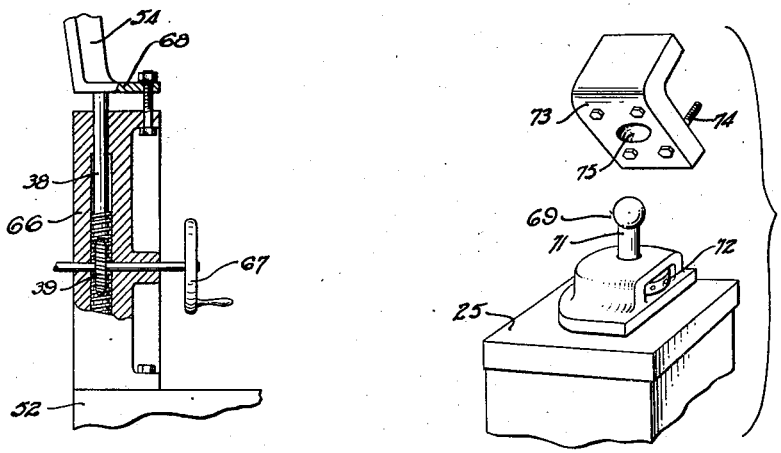
fig. 3
fig. 4
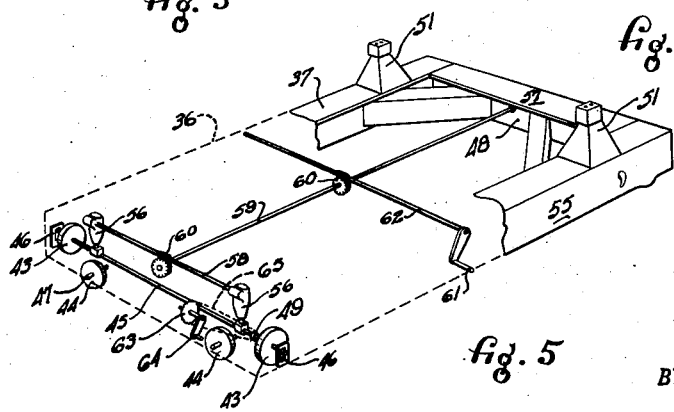
fig. 5
W. F. PIOCH
G. E. SCARLETT
INVENTOR.
BY
Attorneys Patented Dec. 25, 1945

2,391,510

UNITED STATES PATENT OFFICE 2,391,510

MATING FIXTURE

William F. Pioch and George E. Scarlett, Detroit, Mich., assignors to Ford Motor Company, Dearborn, Mich., a corporation of Delaware Application May 13, 1944, Serial No. 535,427

10 Claims. (Cl. 214—1)

This invention relates to the manufacture of aircraft, and, more particularly, to a combination of fixtures and method of operation thereof of particular value in the mating and assembly of aircraft components.

From the earlier stages of the art, it has been customary to fabricate aircraft on an individual rather than a repetitive basis. Although such methods were satisfactory while the ships remained comparatively simple and accessible, as design and performance requirements required larger ships of greater complexity and superior strength, it was found that, on the ground of accessibility alone, there had to be a departure from traditional methods. The advantages in mass production are, of course, well known. Accordingly, the suggestion is frequently made that mass production methods, particularly those exemplified by the line assembly method used in automobile plants, should be carried into the aircraft field. The difficulty inherent in this is that the structures are not directly analogous and the mere use of a moving conveyor line multiplies the complexity of the problem rather than simplifies it.

The application of the principles of mass production to aircraft required an entirely new approach to the problem from that existing in other assembly fields. This, in turn, required new equipment constructed on different lines and a development of a technique suited to the particular problems involved.

One of these problems and its solution are disclosed in this application. Fundamentally the principal aircraft components—wing, fuselage, engines and landing gear—occupy considerably different relationships than do the engine, chassis and body of the conventional motor car, and must be treated accordingly. To obtain simplicity, the structure must be broken up into as many subcomponents as are economically feasible and these subcomponents, in turn, must be fabricated in such a way as to permit maximum accessibility for the many controls, conduits and other elements which are included in them. These subcomponents then may be joined together to form the final assembly, but each must be treated as a unit rather than as a mere addition to some more basic element, as in the case of the automobile assembly. In the present case, the method to be used in assembling the major components is considered with particular reference to the method to be followed in mating and assembling fuselage components.

An advantage of this invention is that the mechanism developed for adaptation to a continuous line method of fixtures has both the requisite accuracy and maneuverability to handle components of large size. Another advantage is the conveying means incorporated for the transfer of components to successive stations provides for the exact positioning of the work at each station. Yet another advantage resides in the specific fixtures employed, by means of which components of tremendous relative size may be carefully controlled and brought into precise mating position with the work. Other advantages include the flexibility of handling, coupled with the rigidity of support during the working operation and the mechanism developed for the control and adjustment of the components throughout all operations.

With these and other objects in view, the invention consists in the arrangement, construction and combination of the various parts of the improved device, described in the specification, claimed in the claims, and illustrated in the accompanying drawings, in which:

Fig. 2 is a perspective detail of a portion of the conveyor used.

Fig. 3 is a sectional view of the vertical adjusting means on the fuselage carriage.

Fig. 4 is a perspective view showing the parts of the wing registry control in detached relation.

Fig. 5 is a perspective view, schematic in nature, of the fuselage carriage wheel arrangement.

Figure 1:
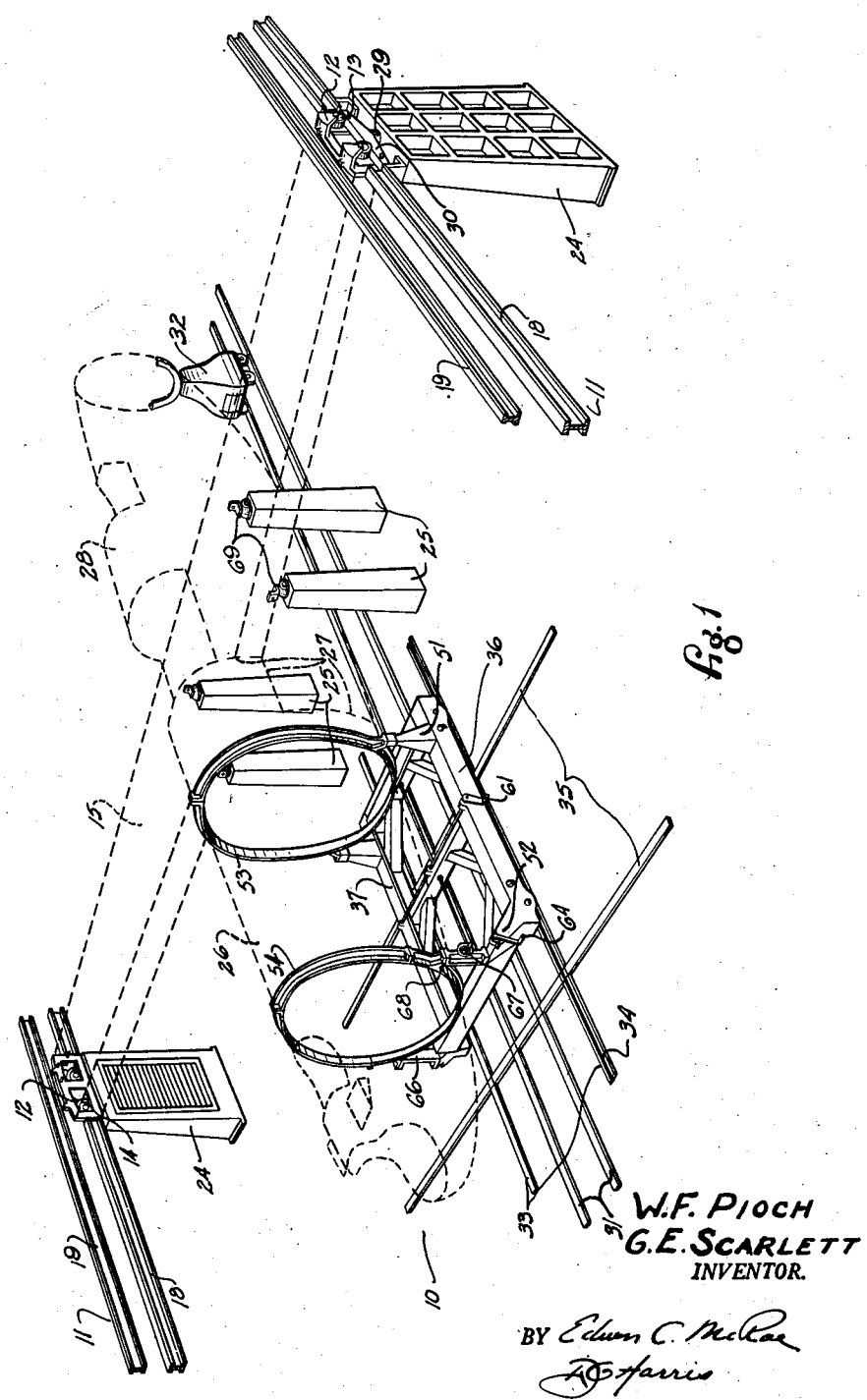
Fig. 1 is a perspective view of an assembly line station constructed according to this invention.

Referring to Fig. 1, 10 indicates an assembly line which is flanked on either side by wing tip conveyors 11. These conveyors comprise a dolly 12, having wheels 13 and an end plate 14 to which the outer end of the wing section 15, shown in dotted line in Fig. 1, is attached by means of bolts 16 extending through the end plate 14 and the wing tip attaching angle 17 (see Fig. 2). The wheels 13 run on the lower conveyor rail 18, while an upper rail 19 supports a link driving mechanism 20 through the rollers 21. Dogs 22 on the link driving mechanism 20 engage the bosses 23 on the dolly 12 when the latter is on the rail 18 as shown at the extreme left of Fig. 2.

The assembly line 10 is made up of a number of successive assembly stations linearly arranged and all served by the wing tip conveyor 11. Only one of these is shown in Fig. 1 but it will be understood that these are successively arranged and each comprises substantially the same basic organization, varying only to accommodate the different operations to be performed at each. Reference to copending application Serial No. 463,266 will illustrate the complete assembly of mechanism used. An assembly station generally comprises a pair of end towers 24 aligned with the wing tip conveyor 11 and four center towers 25 arranged between the end towers 24. The particular assembly station shown in Fig. 1 is for the mating of an aft fuselage section 26 to the wing section 15, to which the forward fuselage section 28 has already been attached, the airframe components proper being shown in dotted outline. The end towers 24, center towers 25 and center track 31 (the purpose of which will be explained later) are fixed in predetermined interrelationship with the greatest possible accuracy and in absolute relative alignment with the assembly line.

Each end tower 24, as best seen in Fig. 2, includes a hydraulic jack having a vertical plunger 29. Affixed to the top of the plunger is rail segment 30 which may be raised so its top is level with the top of the lower conveyor rail 18 or lowered, as shown in Figs. 1 and 2, so that the bosses 23 are disengaged from the dogs 22 and the dolly occupies the position shown.

The assembly line 10 also comprises the center track 31 which runs parallel with the wing tip conveyors 11 and upon which the nose transfer truck 32 runs to balance the airframe component during its transfer between successive stations. At this particular station, it also comprises a carriage track 33 having at least one rail 34 in V form. Normal to the carriage track 33 is the runout track 35 which extends from one side of the carriage track. Associated with the carriage track and the runout track and designed to run selectively on either is a tail section carriage 36 which includes a rectangular frame 37 equipped with two sets of four wheels, each said set being arranged normally, the first set 43 adapted to engage carriage track 33 and second set 44 adapted to engage runout track 35 as best shown in Fig. 5. There it will be seen that the first set 43 is retractably mounted in the frame 37, the ends of each axle 45 being mounted in a slideway 46 secured to the outer web 55 of the frame side member and a pair of jacks 56 are interposed between the cover plate 57 of the end frame member and the axle to raise and lower the wheels. The jacks 56 are interconnected from side to side by the transverse shafts 58 and the end pairs are driven through the longitudinal shaft 59 and worm gearing 60 by the crank 61 on the drive shaft 62. The axles 47 of the second set of wheels are journaled between the inner and outer webs 48 of the end frame members and no provision is made for changing their vertical position. A chain pinion 49 is secured to one axle 45 and is driven by the chain gear 63 and crank 64 through the chain 65 which permits compensation for different relative positions of the axle 45. Operation of the crank 64 will rotate one of the pairs of the first set of wheels and provide longitudinal movement of the tail section carriage 36. The wheels of the first set 43 on one side of the frame are preferably formed with a V tread to engage the V rail 34 so that the longitudinal alignment of the tail carriage is precisely maintained when it is operated on the carriage track 33.

The tail section carriage 36 also includes cradle supports 51 at the front and 52 at the rear thereof designed to support the front and rear tail section straps 53 and 54. The purpose and method of use of these straps is more fully set forth in copending application Serial No. 487,278. The rear cradle 52 is equipped with a worm jack 38 in each column 66 operated by the handwheel 67 through worm wheel 39, the top of the jack engaging the underside of the foot 68 of the rear tail strap 54. Operation of the handwheel 67 will then provide a slight range of vertical movement for leveling the fuselage section, should this prove necessary.

The four center towers 25 have a ball locating means 69 shown in detail in Fig. 4 mounted on a shank 71, the lower portion of which is threadedly engaged in the capstan 72 so that the vertical position of the locating means can be initially adjusted. Once this is done, with reference to the track elevation at the station, the position of the locating means remains unchanged throughout. The purpose of the ball locating means 69 is to engage the recess 75 in the socket means 73 permanently mounted on the wing, as explained and described in copending application Serial No. 487,279, the socket means 73 being secured in place on the wing by the bolts 74. In operation a dolly 12 is secured to each end of a wing section 15 at the start of the assembly line by the bolts 16 passed through the end plates 14 of the dollies and the wing tip attaching angles 17 of the wing section; and the dollies are set on the wing tip conveyor lines 11. The link driving mechanism 20 is then started and the dogs 22 of the mechanism engage the bosses 23 on the dollies 12 projecting the latter along the lower conveyor rail 18. During this stage of the operation, the rail segment 30 at each assembly station is in its raised position so that its upper surface aligns with the upper surface of the lower conveyor rail 18. When the dollies, bearing the wing section 15, arrive at designated assembly stations, the link driving mechanism 20 is slowed and the plunger 29 operated, lowering the rail segment 30 and withdrawing the bosses 23 of the dollies 12 from engagement with the dogs 22 of the link driving mechanism, thereby stopping the forward movement of the dollies 12. The longitudinal position of the dollies 12 on the rail segment 30 is adjusted by hand so that as the plunger continues to descend, the recess 75 of the socket means 73 on the lower surface of the wing section 15 will come into precise alignment with the ball locating means 69 on the center towers 25. These elements then engage and through their conformation support the wing section both in elevation and alignment in predetermined position irrespective of the position of the plunger 29, since the whole weight of the wing and assembled components is now borne on the four center towers. Preliminary to this, the nose transfer truck 32 may be moved out of the way since its only function is to steady the fuselage in transit between successive assembly stations and it engages the fuselage only when the former is in the elevated position corresponding to the dolly 12 running on the lower conveyor rail 18. At this stage, then, the wing and such portions of the fuselage that may already have been assembled to it are positioned and supported entirely by the ball and socket contact established between it and four center towers.

While the moving operations referred to in the preceding paragraph are being accomplished, the tail section carriage 36, with its first set of wheels 43 raised, rests on the runout track 35 in a position at one side of the center of the assembly line so as to clear the center track 31 and permit the passage of the wing and the fuselage components assembled to it. While in this off-position, the tail fuselage section 26 supported by the straps 53 and 54 is lowered into place on the carriage 36, the foot 68 of the straps engaging the forward and aft supports 51 and 52. It is locked in place thereon as shown in copending application No. 487,278 or by the bolt 40 as shown in Fig. 3 or dowel pins extending into holes 41 in Fig. 5. This locates the tail fuselage section 26 precisely with respect to the tail section carriage 36. After the wing and its associated fuselage components are resting on the four center towers, the tail section carriage 36 is propelled along the runout track 35 by hand until the first set of wheels 43 is vertically aligned with the carriage track 33. The first set of wheels 43 is then lowered in the slideways 46 until it engages the carriage track 33 and is continued until the second set of wheels 44 is lifted clear of the runout track 35. It is now apparent that the carriage itself and the attached fuselage section are in predetermined alignment and elevation within the center towers 25 and hence with the wing 15 and its assembled associated fuselage components supported thereon.

The crank 64 is then operated slowly propelling the tail section carriage 36 along the carriage track 33 until the aft fuselage section 26 is in approximately correct relation with the wing section 15 and its associated components. At this stage the mating surfaces between the wing and aft fuselage sections (indicated by the dotted line 27 in Fig. 1) are close enough so that inspection will reveal what adjustment, if any, is required between the two components to bring them into absolute register. As a matter of fact, this is limited, at most, to slight discrepancies in elevation and not in alignment. As the aft section is of considerable length, some slight longitudinal distortion may be expected in it and it is for this purpose that the handwheel 67 in the column 66 is provided so that the rear of the fuselage section may be raised or lowered slightly as required to obtain precise parallelism both in abutting and telescoping mating surfaces between the aft fuselage section and the fuselage section associated with the wing. The whole fuselage section may then be raised or lowered while maintaining this parallelism by operation of the crank 64. When registry is obtained, the components are moved tightly together and permanent connections between the aft fuselage section, the wing and the fuselage section associated with the wing are made, completing the structural assembly between these main components.

After the completion of the structural connection, the means securing the feet 68 of the front and rear straps 53 and 54 to the supports 51 and 52 are released and the straps removed. The plunger 29 is then operated, raising the dollies 12 and the wing 15 and its attached fuselage sections 26 and 28 to the level of the top of the lower conveyor rail 18. In this position, the dogs 22 on the link driving mechanism 20 again engage the bosses 23 on the dollies and project the entire assembly which now comprises the wing and substantially the completed fuselage to the next station. The lift between the lower position of the rail segment 30 and the top of the lower conveyor rail 18 is sufficient so that the aft fuselage section now attached to the wing is lifted clear of the carriage 36 and may be carried forward over this obstruction, the whole assembly being in substantial balance. The nose transfer truck 32 is re-engaged with the forward portion of the fuselage and further balances the assembly for its transit to the next station. Thereafter, the carriage 36 is realigned with the runout track 35, the first set of wheels retracted in the slideways 46, the second set of wheels re-engaged with the runout track 35 and the carriage moved transversely to its original position in which it is clear of the center track. The entire operation may then be completed with successive assemblies.

With the method of conveyance shown, the prior assemblies, namely the wing, and such fuselage components as may be attached to it, are so supported that the stress therefrom is distributed in substantially the same manner as the stresses encountered in flight for which the structure was primarily designed. Similarly, by utilizing the common registry points defined by the locating sockets throughout successive operation, accurate alignment is assured; and these, moreover, are so located that any distortion which might cause a misalignment is reduced to a minimum. The step of lowering the entire assembly at successive stations permits the use of permanently secured fixtures without hampering the floor work; and it is only when such fixtures are permanently secured that requisite accuracy is obtainable. The same consideration applies to the arrangement of the tail section carriage which permits work to pass through when it is on the runout track but which may be brought under the carriage track and manipulated thereon with assurance that it will be in proper elevation and alignment with the remainder of the fixture. Attention, too, is directed to the fact that means are provided for individual disengagement of the dollies and the conveyor so that assemblies may be transported at least as far as the first occupied station without disturbing the work at that station.

Some changes may be made in the arrangement, construction and combination of the various parts of the improved device without departing from the spirit of the invention and it is the intention to cover by the claims such changes as may reasonably be included in the scope thereof.

The invention claimed is:

1. In an aircraft assembly device, a longitudinal conveyor traversing a plurality of successive assembly stations, said conveyor comprising a track and spaced moveable supporting means mounted thereon adapted to engage respectively an aircraft wing section adjacent its opposite outer ends, a plurality of fixed supports at each said station spaced inwardly of said supporting means, and means selectively to withdraw said moveable supporting means from said conveyor track and engage said wing section carried thereon with said fixed supporting means and to disengage said wing section from said fixed supporting means and restore it to said conveyor track.

2. In an aircraft assembly device, a longitudinal conveyor traversing a plurality of assembly stations, said conveyor comprising a pair of spaced tracks, a dolly on each said track, means on said dolly to engage a wing section adjacent the end thereof and support said wing section for movement along said tracks, driving means to engage said dollies and move said wing section from station to station along said conveyor, a plurality of fixed supports at each of said stations arranged in predetermined elevation and alignment, means on said conveyor at each of said stations to lower said dollies from said track to engage said wing on said fixed supports, and cooperating registry means on said fixed supports and said wing to secure the relative predetermined alignment and elevation of said wing in immobilized position thereon.

3. In an aircraft assembly device, a longitudinal conveyor traversing a plurality of assembly stations, said conveyor comprising a pair of spaced elevated rails, dollies on said rails adapted to engage opposite ends of a wing section to be supported therebetween for movement along said rails, driving means to transport said dollies from station to successive station, a plurality of fixed supports at each said station arranged in predetermined alignment and elevation intermediate said rails, means at each said station to lower said dollies from the elevation of said rail and engage the wing carried therebetween on said fixed supports, there being cooperating registry means on said wing and said supports to align said wing in predetermined position independent of the alignment of said rails.

4. In an aircraft assembly device, a rail, a railborne conveyor means, said conveyor means arranged to traverse an aircraft wing section along said rail through a plurality of assembly stations, fixed locating means at each said assembly station adapted to receive and support said wing section in predetermined elevation and alignment, means to lower a section of said rail adjacent each said assembly station to bring said wing section into elevational engagement with said fixed locating means, said conveyor means having limited free longitudinal movement on said rail section to permit adjustment of alignment between said locating means and said wing section, driving means to propel said conveyor means and associated wing section to said successive stations, said driving means being disconnected when said rail section is lowered.

5. In an aircraft assembly mechanism, comprising, a pair of spaced conveying elevated rails extending longitudinally, dollies thereon adapted to engage opposite ends of an aircraft wing section therebetween and to carry said wing section to a plurality of successive assembly stations traversed by said rails, a plurality of fixed locating means at each said assembly station intermediate said conveying rails, means on said fixed locating means adapted to engage predetermined locations on said wing section and to secure said section in predetermined alignment and elevation, means to lower said wing section from the elevation of said rail into engagement with said fixed locating means, a second floor level conveyor extending longitudinally intermediate said pair of rails adjacent one said station, said second conveyor comprising a carriage moveable longitudinally in predetermined alignment with said fixed locating means, a support on said carriage to engage an aircraft fuselage component to be mated to said wing section in predetermined elevation and alignment with said fixed locating means, and means whereby said carriage may be moved longitudinally to engage said fuselage component thereon with said wing section supported on said fixed locating means.

6. In an aircraft assembly device, a pair of spaced longitudinal elevated conveyor means adapted to engage the opposite ends of a wing component and to traverse said wing component to an assembly station, spaced supporting means at said assembly station intermediate said pair of conveyor means adapted to receive said wing component in a pre-established location and secure said wing component in predetermined and fixed alignment and elevation, a ground level fuselage conveyor midway between said pair of conveyor means and comprising a carriage mounted for controlled longitudinal movement, a cradle on said carriage designed to support a fuselage component in predetermined alignment and elevation with respect to said supporting means, means to disengage said wing components from said pair of spaced elevated conveyors and lower said wing component into engagement with said supporting means, and means to advance said carriage and the fuselage component thereon at maintained elevation and alignment into engagement with said wing component on said supporting means.

7. The structure of claim 6 which is further characterized in that a second ground level conveyor runs transversely to and intersects said ground level fuselage conveyor, and wheel means on said carriage selectively engaging said first or second ground level conveyors to permit said carriage to move longitudinally into mating engagement with said supporting means or transversely to one side of said spaced supporting means.

8. In an aircraft assembly station, a plurality of spaced supporting columns having locating means thereon and adapted to receive the wing of an aircraft assembly in fixed alignment and elevation thereon, a track aligned between said columns and normal to said wing when supported thereon, a carriage moveably mounted on said track, cradle supports on said carriage adapted to receive a fuselage component for mating to said aircraft wing, a second track intersecting said first track rearwardly of said columns, said carriage being selectively operable on each of said tracks, means to adjust the relative elevation of at least one of said cradle supports, and means for the conveyance of said wing to and from said station and the lowering of said wing into engagement with said columns and raising said wing therefrom.

9. In an aircraft assembly device, an assembly line, elevated rails on each side of said line, dollies adapted to travel on said rails, means on said dollies for the attachment of the end of a wing section of an aircraft assembly, an assembly station on said line, a pair of fixed supports on each side of said line at said assembly station intermediate said rails, portions of said rails being depressable adjacent said assembly station to permit the lowering of said dollies and attached wing section into engagement with said supports, and cooperating registry means on said wing and said supports to secure said wing thereon in predetermined elevation and alignment independent of the elevation and alignment of said rails.

10. In an aircraft assembly device, an assembly line, elevated rail conveyors on each side of said line, a dolly adapted to travel on each of said rail conveyors, means on each said dolly for the attachment to an end of a wing portion of an aircraft assembly, an assembly station on said line, a pair of fixed columns on each side of said line at said assembly station intermediate said rail conveyors, sections of said rail conveyors being vertically moveable adjacent said assembly station to permit the lowering of said dollies and the attached wing to engage said wing with said columns, driving mechanism above said rail conveyors effective to move said dollies along said rail conveyor and automatically disengaged therefrom when said dollies are lowered on said moveable rail section.

WILLIAM F. PIOCH.
GEORGE E. SCARLETT.